United States Patent
Wyrostek (10) Patent No.: US 9,027,761 B2
(45) Date of Patent: May 12, 2015

(54) SOILED ANIMAL LITTER SEPARATING DEVICE

(71) Applicant: Timothy J. Wyrostek, Toledo, OH (US)

(72) Inventor: Timothy J. Wyrostek, Toledo, OH (US)

( * ) Notice: Subject to any disclaimer, the term of this patent is extended or adjusted under 35 U.S.C. 154(b) by 91 days.

(21) Appl. No.: 13/986,887

(22) Filed: Jun. 14, 2013

(65) Prior Publication Data

US 2013/0333626 A1   Dec. 19, 2013

Related U.S. Application Data

(60) Provisional application No. 61/689,881, filed on Jun. 14, 2012.

(51) Int. Cl.
 *A01K 29/00* (2006.01)
 *A01K 1/01* (2006.01)

(52) U.S. Cl.
 CPC ................................. *A01K 1/0114* (2013.01)

(58) Field of Classification Search
 USPC ........... 209/259, 370, 373, 374; 119/165, 166
 See application file for complete search history.

(56) References Cited

U.S. PATENT DOCUMENTS

| | | |
|---|---|---|
| 326,866 A | 9/1885 | Harcourt |
| 790,572 A | 5/1905 | Hickman |
| 990,909 A | 5/1911 | Sattley |
| 990,911 A | 5/1911 | Sattley |
| 1,027,734 A | 5/1912 | Hunnicutt |
| 1,070,601 A | 8/1913 | Haynie |
| 1,141,727 A | 6/1915 | Seaman |
| 2,289,002 A | 7/1942 | Fleming et al. |
| 2,595,713 A | 5/1952 | Siernos |
| 2,612,896 A * | 10/1952 | Fox .............................. 131/235.1 |
| 3,100,474 A * | 8/1963 | Schneider ...................... 119/166 |
| 3,315,807 A | 4/1967 | Rosen |
| 3,796,188 A | 3/1974 | Bradstreet |
| 4,003,522 A | 1/1977 | Buckley |
| 4,327,667 A * | 5/1982 | Bilak ............................. 119/166 |
| 4,602,593 A | 7/1986 | Gross |
| 4,848,607 A | 7/1989 | Halley |
| 4,854,267 A * | 8/1989 | Morrow ........................ 119/161 |
| 5,211,133 A | 5/1993 | Foley |
| 5,325,815 A | 7/1994 | Gumpesberger |
| 5,394,833 A * | 3/1995 | Glass ............................. 119/166 |
| D359,832 S | 6/1995 | Woolrich |
| D364,944 S | 12/1995 | Blaine |
| 5,515,812 A | 5/1996 | Faust |
| 5,517,947 A | 5/1996 | Cristman |
| 5,592,900 A * | 1/1997 | Kakuta .......................... 119/164 |
| 5,622,140 A * | 4/1997 | McIlnay-Moe ............... 119/166 |
| 5,673,648 A | 10/1997 | Ayle |
| 5,690,051 A | 11/1997 | Fisher et al. |
| 5,749,317 A | 5/1998 | Richey et al. |
| 5,823,138 A * | 10/1998 | Marts ............................. 119/166 |
| 6,205,954 B1 * | 3/2001 | Bogaerts ....................... 119/166 |
| 6,401,660 B1 | 6/2002 | Wolff |
| 6,941,894 B2 | 9/2005 | D'Anielo |
| 7,013,835 B2 * | 3/2006 | Brokaski ........................ 119/166 |

(Continued)

*Primary Examiner* — Joseph C Rodriguez (74) *Attorney, Agent, or Firm* — David C. Purdue (57) ABSTRACT

A device for separating clean litter from soiled litter comprising a receptacle with one inlet and two discharge outlets. Soiled animal litter enters the receptacle through the inlet and clean litter is separated out from the soiled litter. When the container is tilted in a first direction, feces exit the container through the first outlet and clean litter is retained in the receptacle. When the container is tilted in a second direction, clean litter exits the container through the second outlet and clean litter is retained in the receptacle.

8 Claims, 8 Drawing Sheets

(56) References Cited

U.S. PATENT DOCUMENTS

| | | |
|---|---|---|
| 7,987,990 B2 | 8/2011 | Srivatsan |
| 8,230,810 B2 * | 7/2012 | Mynatt et al. ................ 119/168 |
| 8,683,952 B2 * | 4/2014 | Miller ........................... 119/166 |
| 2009/0013935 A1 * | 1/2009 | Beck ............................. 119/166 |

* cited by examiner

SOILED ANIMAL LITTER SEPARATING DEVICE

CROSS-REFERENCE TO RELATED APPLICATIONS

None.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC

Not applicable.

BACKGROUND OF THE INVENTION

1. Field of the Invention
This invention concerns the field of pet waste management.
2. Background of the Invention
In a prior art search directed to the subject invention, the following US Patents were noted: U.S. Pat. Nos. 7,987,990; 6,941,894; 6,401,660; 5,823,138; 5,749,317; 5,690,051; 5,673,648; 5,517,947; 5,515,812; 5,394,833; 5,325,815; 5,211,133; 4,848,607; 4,602,593; 4,003,522; 3,796,188; 3,315,807; 2,595,713; 2,289,002; 1,141,727; 1,070,601; 1,027,734; 990,911; 990,909; 790,572; 326,866; D 364,944 and D 359,832.

BRIEF SUMMARY OF THE INVENTION

The present invention is a receptacle with one inlet and two discharge outlets. Soiled animal litter enters the receptacle through the inlet and feces, together with soiled or clumped litter, are separated from clean litter. Feces and soiled litter are directed towards a first one of the outlets and unsoiled litter is directed towards the other, second, outlet. The container then can be tilted in a first direction with the result that feces and soiled litter exit the container through the first outlet. The container can then be tilted in a second direction so that clean litter exits the container through the second outlet.

Accordingly, it is an object of the invention to provide a device into which the contents of an entire pet litter container can be dumped.

It is a further object of the invention to provide a device which effectively separates soiled litter from clean litter.

It is a further object of the invention to provide a device which has a first outlet for dumping soiled litter into a suitable receptacle.

It is a further object of the invention to provide a device which has a second outlet for dumping clean litter into a suitable receptacle, such as a pet litter box, for reuse.

It is a further object of the invention to provide a device which simplifies the dirty job of cleaning pet litter.

It is yet another object of the invention to provide a method for cleaning pet litter which is faster and easier than current methods.

It is yet another object of the invention to provide a method for cleaning pet litter which is more efficient than current methods.

It is yet another object of the invention to provide a method for cleaning pet litter which is more sanitary and less dirty than current methods.

These and many other objects and advantages of the invention will be understood by persons skilled in the art who study the following description and the accompanying drawings which, although thorough, are merely illustrative of the device.

DETAILED DESCRIPTION OF THE INVENTION

Figure 1:
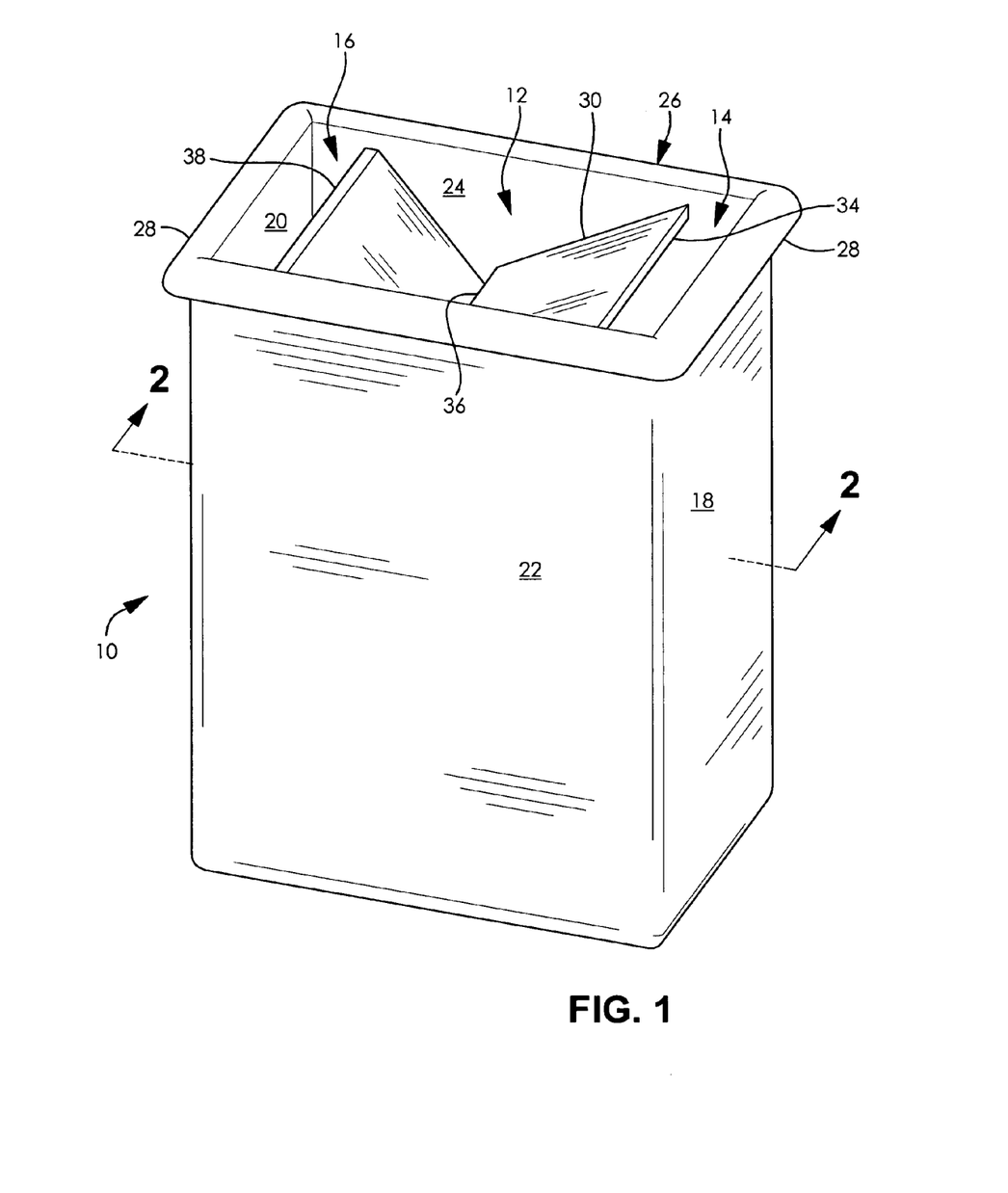
FIG. 1 is a perspective view of an example of a device according to the invention.

A receptacle according to the present invention is indicated generally at 10 in FIG. 1 and it comprises an inlet 12, a first outlet 14 and a second outlet 16. The container further comprises a first side wall 18, a second side wall 20, a front wall 22 and a rear wall 24. A lip 26 at the top of the receptacle 10 provides handles 28. The inlet 12 is defined by a first baffle 30 and a second baffle 32. The first baffle 30 is spaced from the first side wall 18 to define the first outlet 14. The second baffle 32 is spaced from the second side wall 20 to define the second outlet 16. The first baffle 30 extends from the front wall 22 to the rear wall 24. The second baffle 32 also extends from the front wall 22 to the rear wall 24. The first baffle 30 slopes downwardly so that a first edge 34 adjacent to the first side wall 18 is closer to the lip 26 than a second edge 36 of the first baffle 30. The second baffle 32 slopes downwardly so that a first edge 38 adjacent to the second side wall 20 is closer to the lip 26 than a second edge 40 (FIG. 2) of the second baffle 32. The second edge 36 of the first baffle 30 is closer to the lip 26 than the second edge 40 of the second baffle 32. The second edge 36 of the first baffle 30 is spaced from the second baffle 32 thereby defining the inlet 12.

Figure 2:
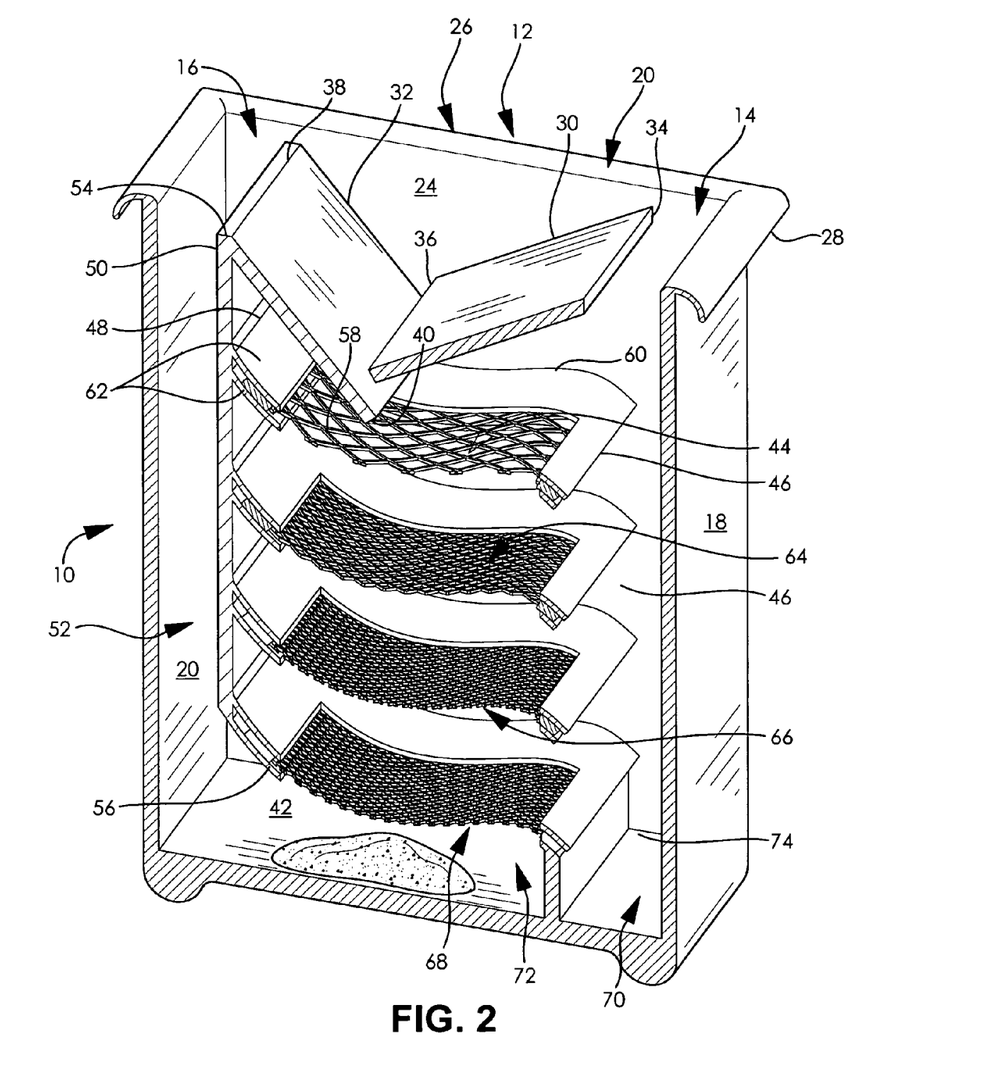
FIG. 2 is a perspective view of the inside of the device, shown in cross-section, taken along the line 2-2 of FIG. 1.

Turning now to FIG. 2, a receptacle bottom 42 extends from the first side wall 18 to a second side wall 20. The receptacle bottom 42 also extends from the front wall 22 (FIG. 1) to the rear wall 24. A first screen 44 is supported within the receptacle 10 and extends between the front wall 22 and rear wall 24. The first screen 44 is positioned between the receptacle bottom 42, on the one hand, and the baffles 30 and 32, on the other hand. A first edge 46 of the first screen 44 is spaced from the first side wall 18. A second edge 48 of the first screen 44 is adjacent to an inner wall 50 which is spaced from the second side wall 20.

The inner wall 50 and the first side wall 18 define a second outlet passageway 52 which leads to the second outlet 16. The inner wall 50 has an upper edge 54 which is adjacent to the first edge 38 of the second baffle 32. The inner wall has a lower edge 56 which is spaced apart from the receptacle bottom 42.

The first screen 44 is supported in the receptacle 10 so that it has a serpentine shape so that the second edge 48 of the first screen 44 is higher, i.e., closer to the lip 26 then a central region 58. This is a preferred embodiment. However, the first screen 44 may be supported so that it is generally planar. A screen support 60 may be provided on the rear wall 24 and corresponding screen support (not shown) may be provided on the front wall 22 so that the first screen 44 is supported in a serpentine shape, or flat, or any other desired configuration. If desired, the second edge 48 of the first screen 44 maybe supported on a screen support 62 provided on the inner wall 50.

A second screen 64 may be supported within the receptacle 10 in a manner similar to the way that the first screen 44 is supported. If a second screen 64 is provided, it should have openings that are smaller than the openings in the first screen 44.

A third screen 66 and a fourth screen 68 with successively smaller openings may be provided with the receptacle 10. Additional screens (not shown) may be provided if desired. The screens should extend from the rear wall 24 to the front wall 22 so that material which enters the receptacle 10 does not pass between the screens and the front and rear walls 22 and 24.

Figure 3:
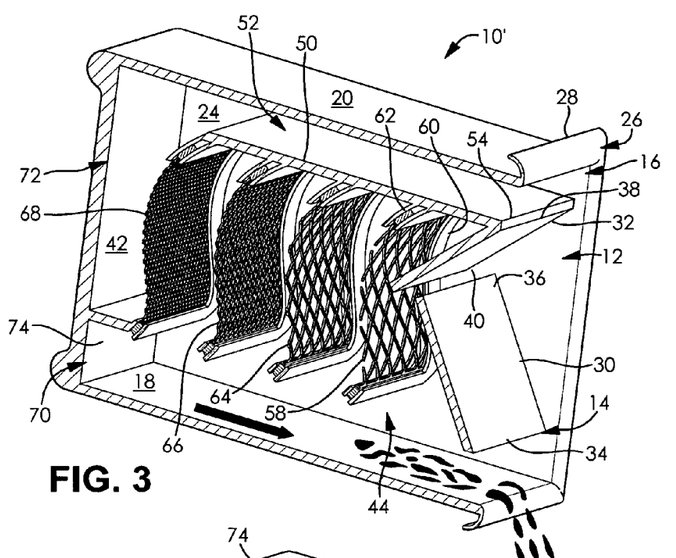
FIG. 3 is a perspective view corresponding with FIG. 2 and showing the device tipped in a first direction.

A first outlet passageway 70 extends along the length of the first side wall 18 to the first outlet 14. When the receptacle 10 is tilted to the position shown in FIG. 3, material which has been caught on the first screen 44 and additional screens, if any, enters the first outlet passageway 70. With the assistance of gravity, material in the first outlet passageway 70 will exit the receptacle 10 through the first outlet 14. Material which passes through the first screen 44 and successive screens, if any, pass into a litter containment region 72. A litter containment baffle 74 separates the first outlet passageway 70 from the litter containment region 72. When the receptacle 10 is tipped to the position shown in FIG. 3, material, i.e., clean litter, is retained within the litter containment region 72 and is prevented from entering the first outlet passageway 70. Thus, clean litter in the litter containment region 72 is prevented from mixing with the soiled litter in the first outlet passageway 70. When the receptacle 10 is tipped from the position shown in FIG. 3 to the position shown in FIG. 1, clean litter remains in the litter containment region 72 and soiled litter has been discharged from the receptacle 10 through the first outlet 14. When the receptacle 10 is tipped from the position shown in FIG. 1 to the position shown in FIG. 4, clean litter, with the assistance of gravity, enters the second outlet passageway 52 and exits the receptacle 10 through second outlet 16. The receptacle 10 is now empty and is ready to be used again.

Figure 5:
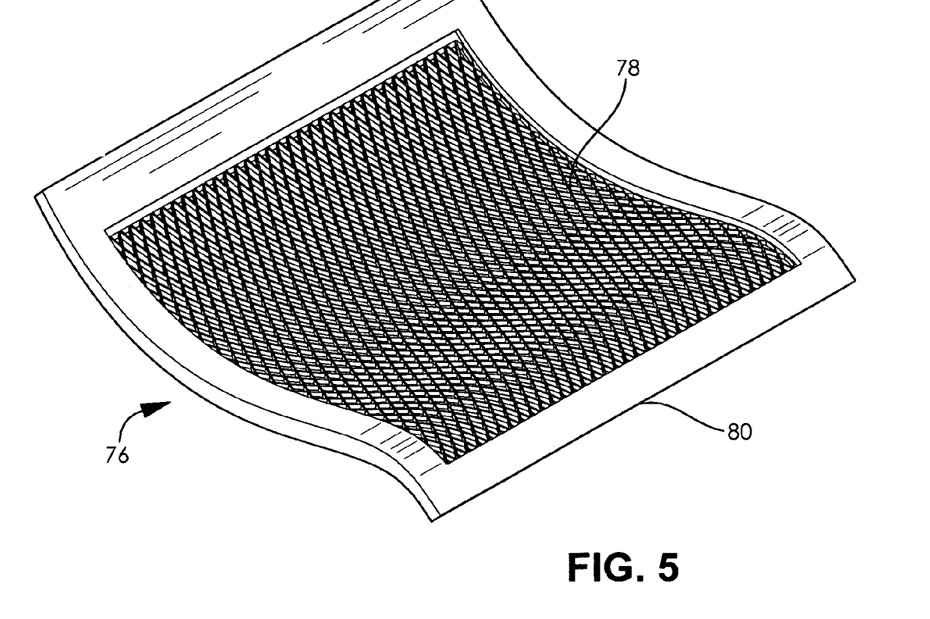
FIG. 5 is a perspective view of a separating screen suitable for use in the invention.

A screen 76 shown in FIG. 5 comprises a sifting screen 78 contained within a frame 80. Portions of the frame 80 may be received within the inner wall screen support 62 and/or the rear wall screen support 60 and/or the corresponding front wall screen support (not shown). The screen 76 may be provided in a flat configuration and caused to assume a serpentine shape by cooperation with the rear wall screen support 60 and/or the corresponding front wall screen support (not shown). Alternatively, the screen 76 may be provided in a flat configuration and supported in the receptacle 10 in a flat configuration or another desired configuration. The screen 76 is suitable for use in the receptacle 10 and may be used in place of one or more of the screens 44, 64, 66 or 68.

Figure 6:
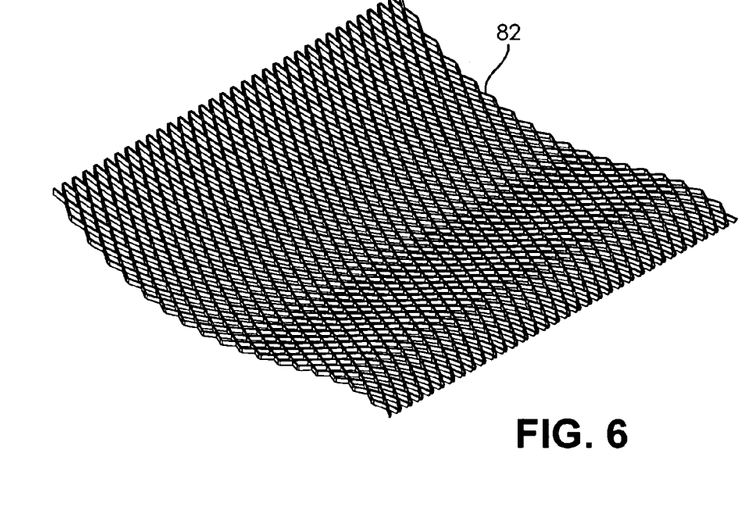
FIG. 6 is a perspective view of a separating screen suitable for use in the invention.

A screen 82 shown in FIG. 6 comprises a sifting screen 78 without a frame. Edge portions of the screen 82 may be received within the inner wall screen support 62 and/or the rear wall screen support 60 and/or the corresponding front wall screen support (not shown). The screen 82 may be provided in a flat configuration and caused to assume a serpentine shape by cooperation with the rear wall screen support 60 and/or the corresponding front wall screen support (not shown). Alternatively, the screen 82 may be provided in a flat configuration and supported in the receptacle 10 in a flat configuration or another desired configuration. The screen 82 is suitable for use in the receptacle 10 and may be used in place of one or more of the screens 44, 64, 66 or 68.

Figure 7:
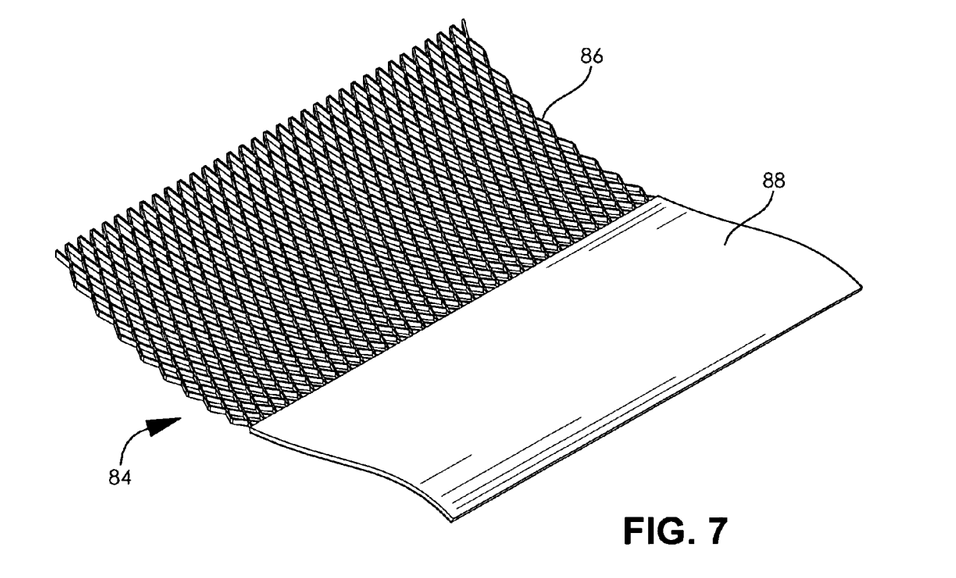
FIG. 7 is a perspective view of a separating screen suitable for use in the invention.

A screen 84 shown in FIG. 7 comprises a sifting screen 86 and a sifting screen extension 88. The screen 84 may be provided with a frame (not shown). The sifting screen extension 88 is not perforated and the screen 84 is preferred for use as the screen that is closest to the receptacle bottom 42 in the receptacle 10. Portions of the screen 84 may be received within the inner wall screen support 62 and/or the rear wall screen support 60 and/or the corresponding front wall screen support (not shown). The screen 84 may be provided in a flat configuration and caused to assume a serpentine shape by cooperation with the rear wall screen support 60 and/or the corresponding front wall screen support (not shown). Alternatively, the screen 84 may be provided in a flat configuration and supported in the receptacle in a flat configuration or another desired configuration. The screen 84 is suitable for use in the receptacle 10 and may be used in place of one or more of the screens 44, 64, 66 or 68 although, as indicated above, it is preferred to use the screen 84 so that it is positioned closest to the receptacle bottom 42.

Figure 8:
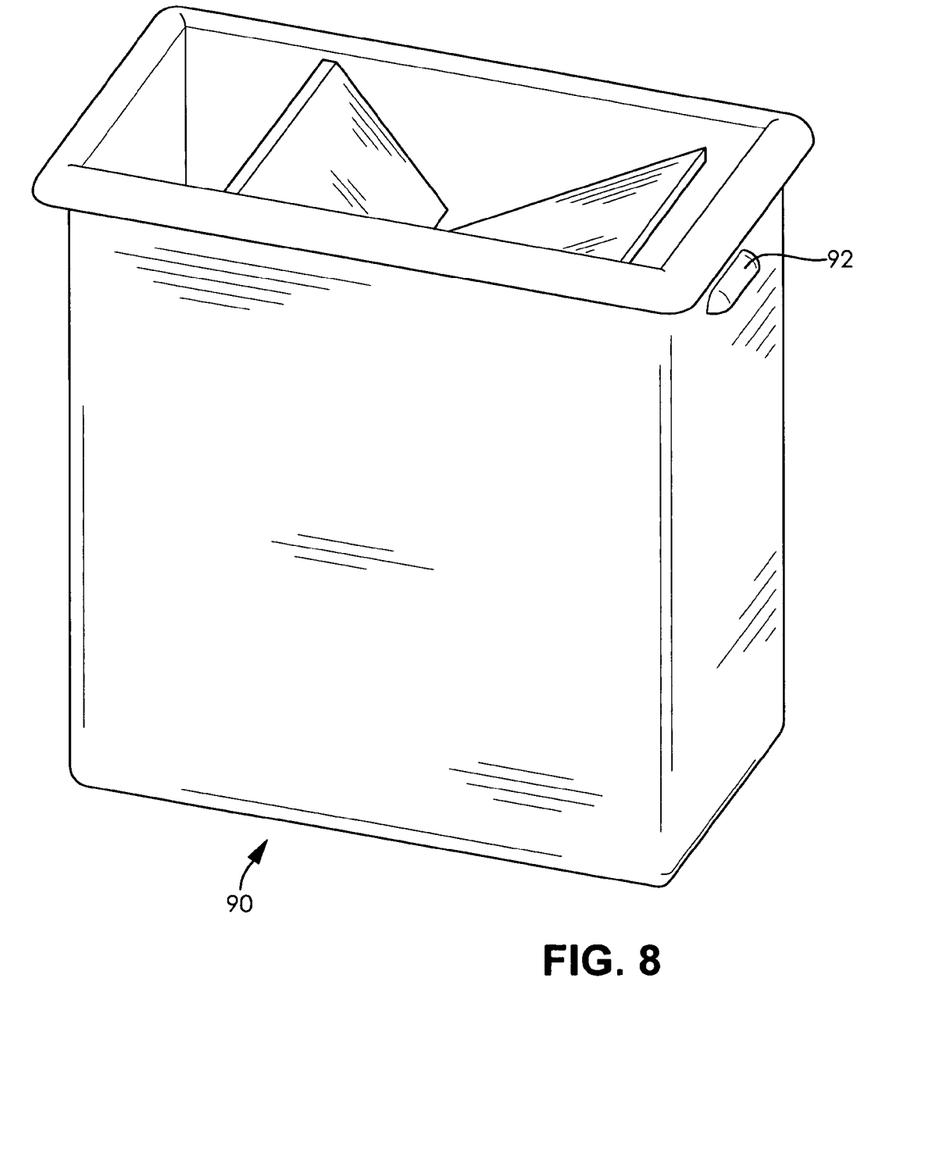
FIG. 8 is a perspective view of another example of a device according to the invention.

Another example of a receptacle according to the present invention is indicated generally at 90 in FIG. 8. A handle 92 is provided on the receptacle 90. The handle 92 makes it easier to control the receptacle 90 as it is being manipulated in the manner described above. Because of the nature of the invention, it is very important to be able to exercise control over the receptacles 10 and 90 whenever they are being manipulated. Additional handles may be included, as desired.

Figure 9:
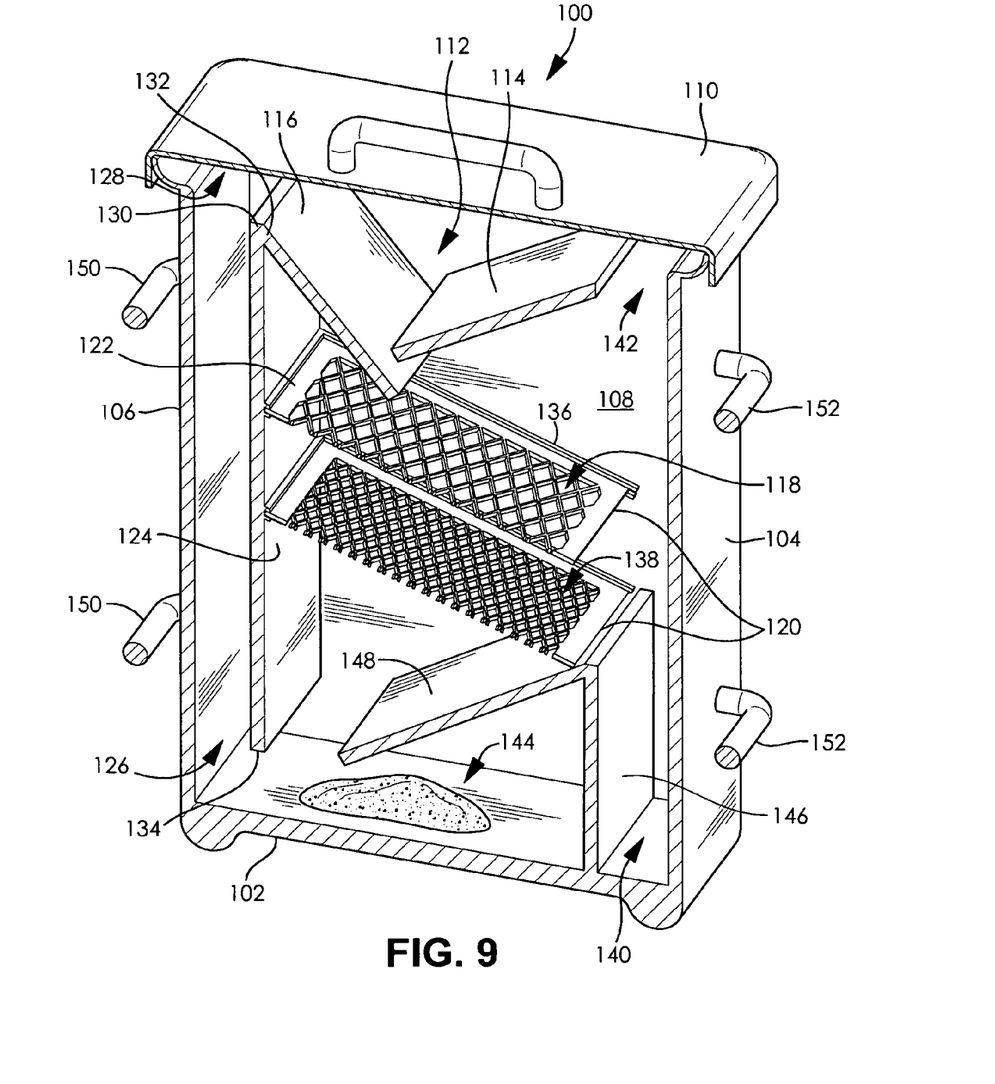
FIG. 9 is a perspective view of another example of a device according to the invention.

Another example of a receptacle according to the present invention is indicated at 100 in FIG. 9. A receptacle bottom 102 extends from a first side wall 104 to a second side wall 106. The receptacle bottom 102 also extends from a front wall (not shown) to a rear wall 108. A removable lid 110 can be used to seal the top of the receptacle 100 when desired.

The receptacle 100 has an inlet 112 near the top defined by a first baffle 114 and a second inlet baffle 116. A first screen 118 is supported within the receptacle 100 and extends between the front wall and the rear wall 108. The first screen 118 is positioned between the receptacle bottom 102, on the one hand, and the baffles 114 and 116, on the other hand. A first edge 120 of the first screen 118 is spaced from the first side wall 104. A second edge 122 of the first screen 118 is adjacent to and may be supported on an inner wall 124 which is spaced from the second side wall 106.

The inner wall 124 and the first side wall 106 define a second outlet passageway 126 which leads to the second outlet 128. The inner wall 124 has an upper edge 130 which is adjacent to an edge 132 of the second baffle 116. The inner wall 124 has a lower edge 134 which is spaced apart from the receptacle bottom 102 to create an opening or inlet to the second outlet passageway 126.

The first screen 118 is substantially planar and is supported in the receptacle 100 so that the edge 120 is closer to the bottom 102 than the opposed edge 122. The first screen 118 may be supported in this orientation in the container 100 by a rear wall screen support 136 and a corresponding screen support on the front wall. If desired, the second edge 122 of the first screen 118 may be supported by a screen support provided on the inner wall 124.

A second screen 138 may be supported within the receptacle 100, between the first screen 118 and the receptacle bottom 102, in a manner similar to the way that the first screen 118 is supported. If a second screen 138 is provided, it should have openings that are smaller than the openings in the first screen 118. Additional screens may be provided and positioned between the inlet 112 and the receptacle bottom 102. These screens, if any, should extend from the rear wall 108 to the front wall like the screens 118 and 138 so that material which enters the receptacle 100 through the inlet 112 does not pass between the screens and the front wall and the rear wall 108.

A first outlet passageway 140 extends along the length of the first side wall 104 to a first receptacle outlet 142. When the receptacle 100 is tilted to the excrement discharge position shown in FIG. 3 for the receptacle 10, material which has been caught on the first screen 118 and additional screens, if any, enters the first outlet passageway 140. With the assistance of gravity, material in the first outlet passageway 140 will exit the receptacle 100 through the first outlet 142. Material which passes through the first screen 118 and successive screens, if any, fall into a litter containment region 144. That material will be substantially excrement free litter because excrement in soiled litter that enters the receptacle 100 through the inlet 112 will be filtered out and will pass into the first passageway 140.

A litter containment baffle 146 separates the first outlet passageway 140 from the litter containment region 144 so that clean litter in the litter containment region 144 is separated from excrement in the first outlet passageway and vice versa. When the receptacle 100 is tipped to the excrement discharge position shown in FIG. 3 for the receptacle 10, material, i.e., clean litter, is retained within the litter containment region 144 and is prevented from entering the first outlet passageway 140. Thus, clean litter in the litter containment region 142 is prevented from mixing with the soiled litter in the first outlet passageway 140.

When the receptacle 100 is tipped to the excrement discharge position, excrement will be discharged from the receptacle through outlet 142 and may be directed into a disposal device such as a waste basket lined with a sealable plastic bag. When the receptacle 100 is tipped from the position of the receptacle 10 shown in FIG. 3, to the upright position of the receptacle 10 shown in FIG. 1, clean litter remains in the litter containment region 140 after soiled litter has been discharged from the receptacle 100 through the first outlet 142. A lateral litter containment baffle 148 helps to maintain clean litter in the litter containment region 144 when the receptacle is tilted to the excrement discharge position. Handles 150 on the second side 106 facilitate tipping the receptacle 100 to the excrement discharge position.

Figure 4:
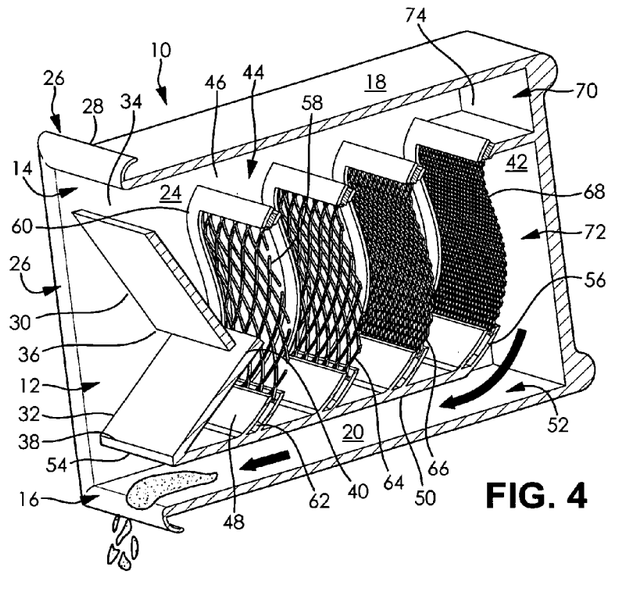
FIG. 4 is a perspective view corresponding with FIG. 2 and showing the device tipped in a second direction.

When the receptacle 100 is tipped from the upright position shown for the receptacle 10 in FIG. 1 to the litter discharge position shown for the receptacle 10 in FIG. 4, clean litter, with the assistance of gravity, enters the second outlet passageway 126 and exits the receptacle 100 through second outlet 128. Clean litter may be directed from the outlet 128 into a litter box or the like. Handles 152 on the first side 104 facilitate tipping the receptacle 100 to the litter discharge position. After excrement and litter have been discharged, the receptacle 100 is empty and is ready to be used again. Alternatively, clean litter may be discharged more than once without discharging excrement. The lid 110 is especially important in this case.

Figure 10:
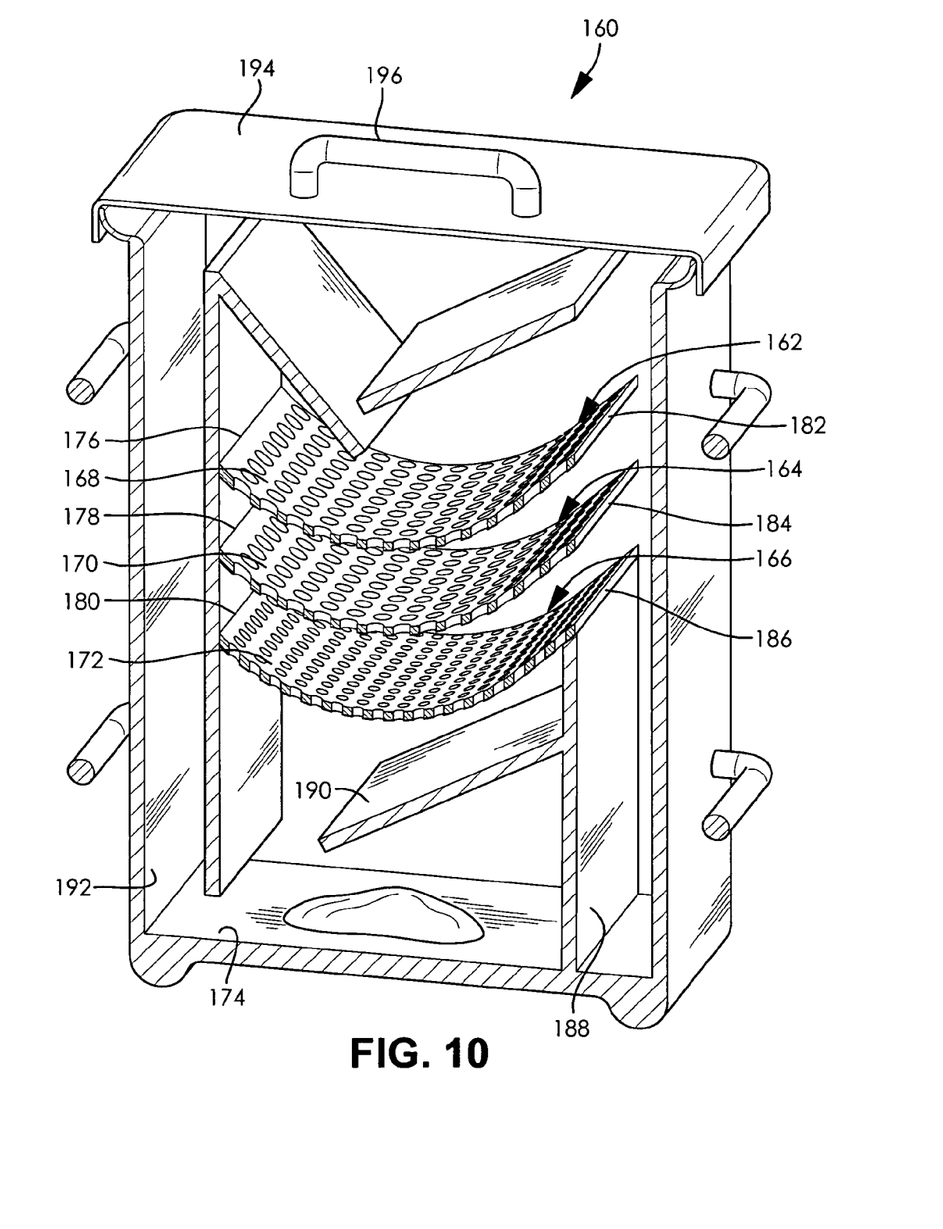
FIG. 10 is a perspective view of another example of a device according to the invention.

Another example of a receptacle according to the invention is indicated generally at 160 in FIG. 10. It corresponds generally with the receptacle 100 shown in FIG. 9 with some differences which are described below. Inside the receptacle 160, there is a first screen 162, a second screen 164 and a third screen 166. The screens 162, 164, and 166 are curved with middle portions 168, 170, and 172 that are lower, i.e., closer to a bottom 174 of the receptacle 160, than first end portions 176, 178, and 180. The middle portions 168, 170, and 172 are also lower, i.e., closer to the bottom 174 of the receptacle 160, than second end portions 182, 184, and 186.

A first vertical litter containment baffle 188 extends upwardly from the bottom 174 of the receptacle 160 and a lateral litter containment baffle 190 extends laterally from the baffle 188 towards a side wall 192 and downwardly from the baffle 188 towards the bottom 174 of the receptacle. The vertical litter containment baffle 188 extends above the lateral litter containment baffle 190 to the second end 188 of the screen 166.

A lid 194 for the container 160 is provided with a handle 196. A gasket (not shown) may be provided on the underside of the lid 194 to engage the upper edge of the receptacle 160 to reduce odor around the receptacle. Alternatively, a gasket may be provided on the upper edge of the receptacle 160 to engage the lid 194 or the upper edge of the receptacle 160 to reduce odor.

It will be appreciated that the invention, as it is described above, is subject to innumerable modifications which would not affect the essential character or nature or function of the invention and such modifications are to be considered to be within the spirit and scope of the invention as defined in the claims appended hereto.

I claim:

1. A device for reclaiming relatively clean animal litter from a mixture of animal litter and excrement, said device comprising     a receptacle     a receptacle inlet near the top of said receptacle for admitting a mixture of animal litter and excrement into said receptacle,     a litter containment region in and near the bottom of said receptacle,     a screen in said receptacle, positioned between said inlet and said litter containment region, said screen being operable, when said receptacle is in an upright position and a mixture of animal litter and excrement enters said receptacle through said inlet, to retain excrement and to pass clean animal litter through to said litter containment region,     a first outlet passageway in and on one side of said receptacle for receiving retained excrement,     a first outlet near the top of said receptacle through which retained excrement may exit said receptacle,     a second outlet passageway in and on an opposed side of said receptacle for receiving litter from said litter containment region,     a second outlet near the top of said receptacle through which clean animal litter may exit said receptacle, and a litter containment baffle for substantially preventing litter in said litter containment region from entering said first outlet passageway.

2. The device claimed in claim 1 wherein said receptacle has a bottom, two opposed side walls, a front wall and a rear wall.

3. The device claimed in claim 1 further wherein said first outlet passageway is defined, in part, by portions of said front wall, said rear wall, and one of said two opposed side walls.

4. The device claimed in claim 2 wherein said second outlet passageway is defined, in part, by portions of said front wall, said rear wall, and one of said two opposed side walls.

5. The device claimed in claim 2 further comprising an inner wall wherein said second outlet passage is defined, in part, by said inner wall.

6. The device claimed in claim 1 further comprising a first outlet passageway outlet wherein, when said receptacle is tipped from an upright position, excrement in said first outlet passageway leaves the receptacle through said outlet and clean litter is contained within said litter containment region.

7. The device claimed in claim 1 further comprising a second outlet passageway outlet wherein, when said receptacle is tipped from an upright position, clean litter in said second outlet passageway leaves the receptacle through said second outlet Passageway outlet and excrement is contained within said receptacle.

8. The device claimed in claim 6 further comprising a second outlet passageway outlet wherein, when said receptacle is tipped from an upright position, clean litter in said second outlet passageway leaves the receptacle through said second outlet passageway outlet and excrement is contained within said receptacle.

* * * * *